(12) United States Patent
Grewal et al.

(10) Patent No.: US 6,829,585 B1
(45) Date of Patent: Dec. 7, 2004

(54) WEB-BASED METHOD AND SYSTEM FOR INDICATING EXPERT AVAILABILITY

(75) Inventors: Sukhminder S. Grewal, New Haven, CT (US); Russell Danziger, New York, NY (US)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 09/610,927

(22) Filed: Jul. 6, 2000

(51) Int. Cl.[7] .............................................. G06F 17/60
(52) U.S. Cl. ....................... 705/8; 709/223; 379/265.05
(58) Field of Search ................. 705/1, 7, 8; 379/265.01

(56) References Cited

U.S. PATENT DOCUMENTS

| | | | |
|---|---|---|---|
| 4,835,683 A | | 5/1989 | Phillips et al. |
| 4,872,122 A | | 10/1989 | Altschuler et al. |
| 5,005,143 A | | 4/1991 | Altschuler et al. |
| 5,517,405 A | * | 5/1996 | McAndrew et al. .......... 706/45 |
| 5,757,904 A | * | 5/1998 | Anderson .............. 379/265.06 |
| 5,805,776 A | | 9/1998 | Juengst et al. |
| 5,815,554 A | * | 9/1998 | Burgess et al. ................ 368/13 |
| 5,987,117 A | * | 11/1999 | McNeil et al. ........... 379/265.1 |
| 6,046,762 A | * | 4/2000 | Sonesh et al. ........... 348/14.11 |
| 6,067,525 A | * | 5/2000 | Johnson et al. ............... 705/10 |
| 6,122,358 A | * | 9/2000 | Shoji et al. ............ 379/265.11 |
| 6,134,318 A | * | 10/2000 | O'Neil .................. 379/266.01 |
| 6,177,932 B1 | * | 1/2001 | Galdes et al. ............... 345/733 |
| 6,223,165 B1 | * | 4/2001 | Lauffer .......................... 705/1 |
| 6,230,287 B1 | * | 5/2001 | Pinard et al. ................. 714/31 |
| 6,490,350 B2 | * | 12/2002 | McDuff et al. ........ 379/265.06 |
| 6,513,013 B1 | * | 1/2003 | Stephanou ...................... 705/9 |
| 2002/0116243 A1 | * | 8/2002 | Mancisidor et al. ........... 705/7 |

FOREIGN PATENT DOCUMENTS

WO      WO 9804061 A1 * 1/1998

OTHER PUBLICATIONS

"Help Desk Software (Help desk software market predicted to rapidly grow; Americans will make 200 mil help desk calls in 199 up from 120 mil in 1995, costing PC suppliers alone nearly $4 bil)"; Jul. 1996, Computer Business Review, V 4, n 7.*

Mirel "Anal;yzing electronic help exchange: an inquiry into instructions for complex tasks"; May 1994; Technical Communication, V41, n2, p210; Dialog file 47, Accession No. 04071773.*

* cited by examiner

Primary Examiner—Romain Jeanty
(74) Attorney, Agent, or Firm—Armstrong Teasdale LLP

(57) ABSTRACT

An expert availability system provides an integrated approach to providing users of a computer system with assisted help on a specific subject, problem or project as well as indicating expert availability and queue statistics through a graphical applet. The system further offers flexibility in providing direct human interaction by linking a group of experts through a web site. For a specific subject, the system provides two distinct paths to the user, an Education Path and an Expert Assistance Path. The system further provides the user an opportunity to contact an expert through a direct e-mail link, or to chat on-line with an expert and to obtain phone call assistance at the user's request.

40 Claims, 9 Drawing Sheets

WEB-BASED METHOD AND SYSTEM FOR INDICATING EXPERT AVAILABILITY

BACKGROUND OF THE INVENTION

This invention relates generally to a computer network-based system and more particularly to a system and method for providing assistance to computer users in an organization on a variety of issues.

For business entities having numerous employees located in multiple divisions worldwide, getting help on a timely basis for computers or systems related issues is a major challenge. Locating a person within an organization to resolve an issue is sometimes difficult in such business entities. Another challenge involves getting an opportunity to discuss the problem with a qualified individual. During the process of locating the appropriate individual and finding a mutually convenient time to discuss the issue, there is normally a significant delay due to exchange of messages and time lag between phone calls from experts.

For example, when a computer user desires to contact a help desk to resolve an issue, the user typically uses one of the traditional methods such as telephone, filling out the forms identifying a problem, undertaking research via the Internet on World Wide Web, or voice mails to identify the problem. These methods are generally cumbersome, impersonal and time consuming. Voice mail systems are not only complex to follow but may also be unresponsive to a computer user's needs. Overall, the traditional methods can be very frustrating and may not necessarily facilitate resolving computer user's issues.

It would be desirable to facilitate resolving technical and non-technical issues or any other general inquiries pertaining to a variety of subjects for a user of a computer system in an efficient manner.

BRIEF SUMMARY OF THE INVENTION

The invention provides an integrated approach to providing users of a computer system with education, information and computer assisted help on a specific subject, problem or project in addition to indicating expert availability and providing viewing queue statistics through a graphical applet.

The system offers flexibility in providing direct human interaction by linking group of experts through a web site. For a specific subject, the invention provides two distinct paths to the user—an Education Path and an Expert Assistance Path. Both of these distinct paths offer various alternatives to resolve the user's issues. Under the Education Path, the user can obtain information from global sources, receive organized product information or obtain information on training, schedule and cost. Under the Expert Assistance Path, the user can interact with an expert or a group of experts. The invention further provides the user an opportunity to contact an expert through a direct e-mail link, or to chat on-line with an expert. The system is capable of brokering phone call assistance to the user at the user's request. The system takes into account available resources and key utilization metrics pre-established for the system's efficient performance.

DETAILED DESCRIPTION OF THE INVENTION

A support portal (Supportal) that assists users on a variety of issues is described. The Supportal, in an exemplary embodiment, is a single entry point through which individuals can seek support, training and action. The Supportal further provides an integrated approach to providing internal users or customers with education, information and computer assisted or human help on a specific subject, problem or project.

Figure 1:
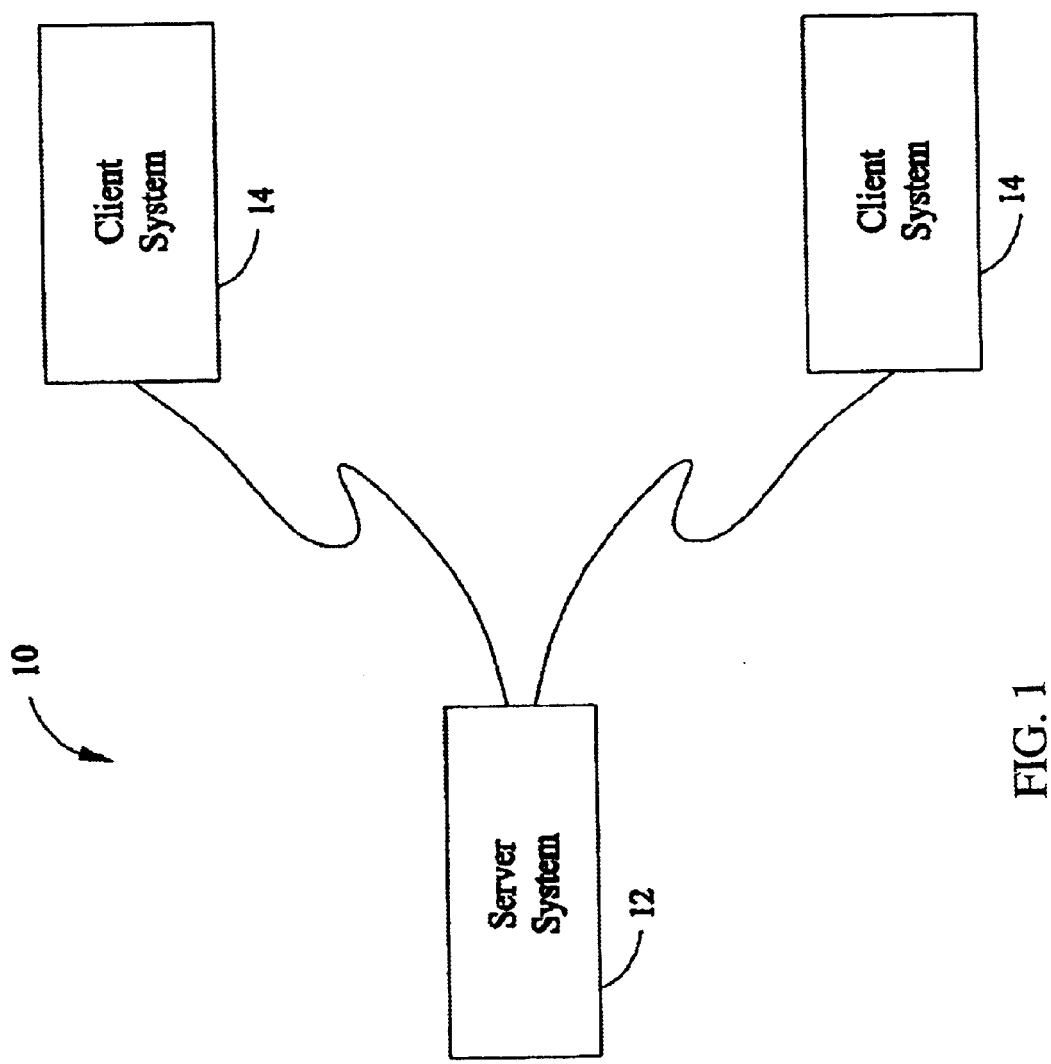
FIG. 1 is a system block diagram.

FIG. 1 is a block diagram of a system 10 in accordance with one embodiment of the present invention. System 10 includes a server system 12 and a plurality of client systems 14 connected to server system 12. In one embodiment, a client system 14 is a computer including a web browser. Server system 12 is accessible to client system 14 via the Internet. Client system 14 is interconnected to the Internet through many interfaces including dial-in-connections, cable modems, special high-speed ISDN lines and networks such as local area networks (LANs) or wide area networks (WANs). Client system 14 could be any client system capable of interconnecting to the Internet including a web-based phone or other web-based connectable equipment. Servers storing information are integrated with server system 12 and can be accessed by potential users at one of client systems 14 by logging onto server system 12.

Figure 2:
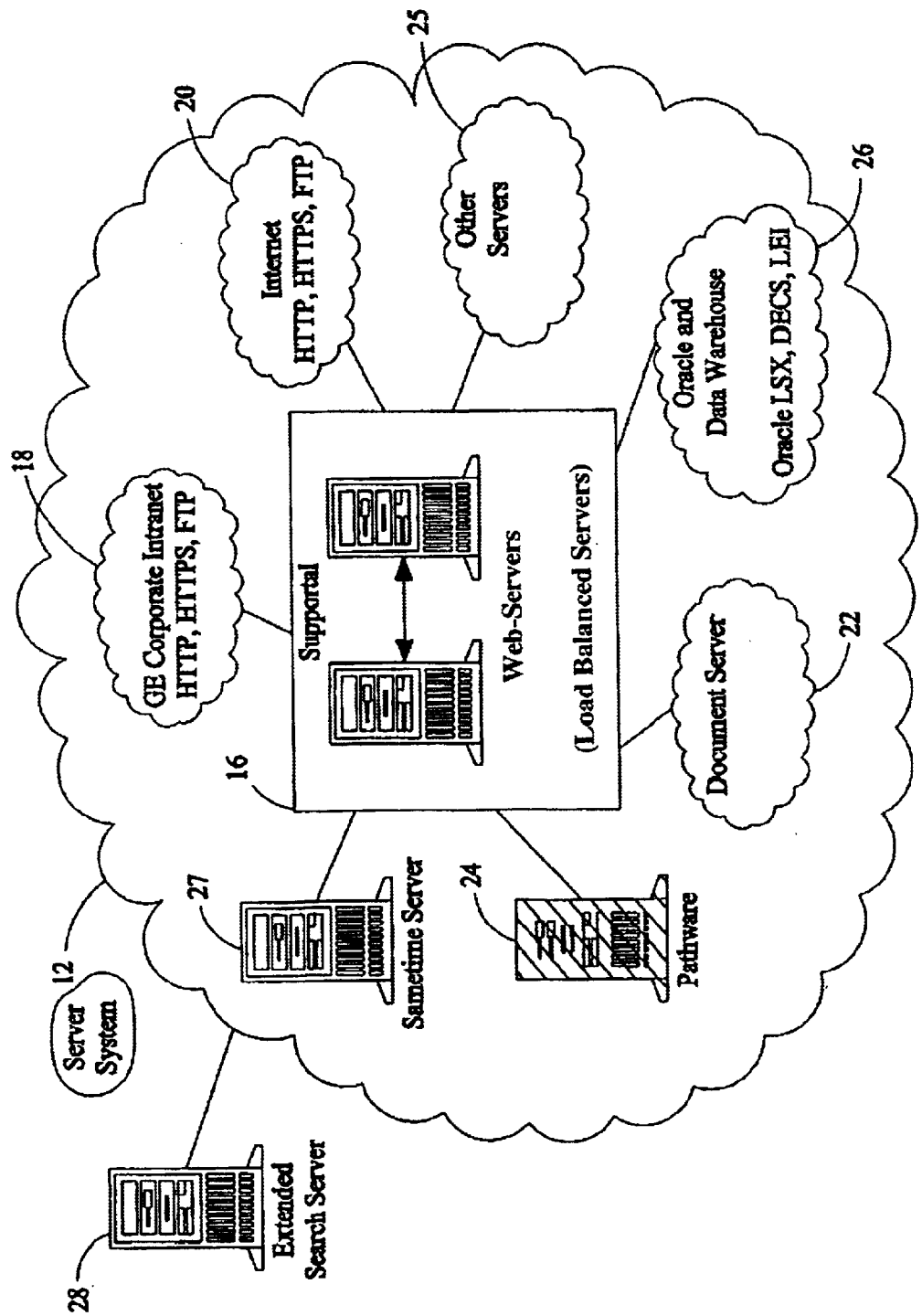
FIG. 2 is an overview of a server system.

FIG. 2 is an overview of server system 12. Supportal 16, web servers which are load balanced, facilitate the discovery of information. Information exists in many formats and in many locations. Using a variety of connection methods, Supportal 16 connects the user with the information. Supportal 16 can, for example, direct users to a corporate intranet 18, the Internet 20, Document Server 22, Pathware Server 24 and other types of servers 25. In addition, the server uses databases 26 such as Oracle LSX, LEI and DECS to exchange information with other databases. In addition, Supportal 16 also provides Instant Messaging, Chat Room and Webinars services by utilizing Sametime (or other "Chat" software) server 27. Server system 12 also includes an extended search server 28 for extended search to index content linked to Supportal 16 and to allow the user to search for information.

Figure 3:
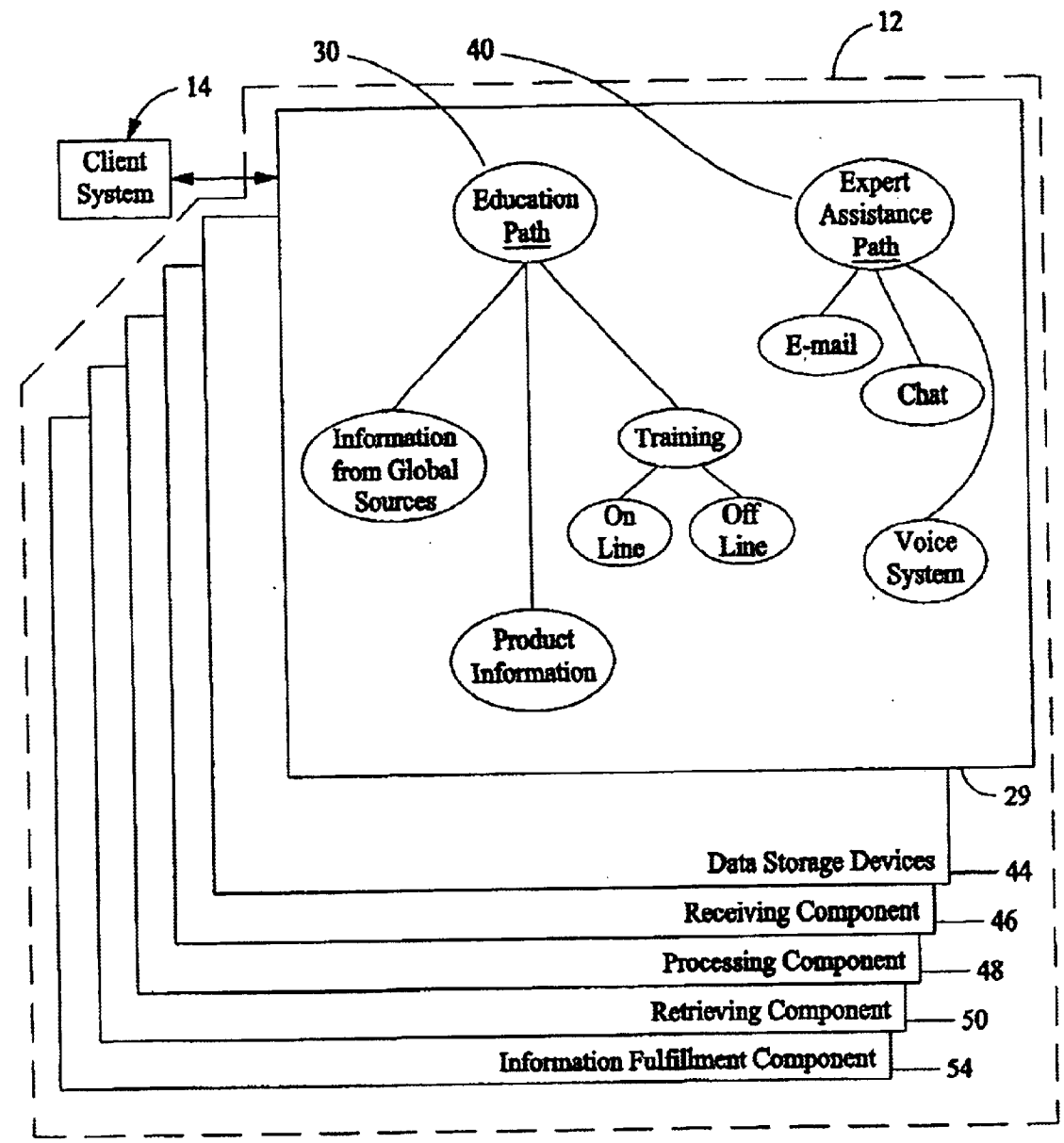
FIG. 3 shows a configuration of a database.

FIG. 3 shows a configuration of a database 29 within server system 12. Database 29 includes two separate components which perform specific tasks. One database component is referred to as an Education Path Component 30 and the other database component is referred to as an Expert Assistance Path Component 40. Components 30 and 40 are further organized into data storage devices 44, a receiving component 46 for receiving a request from client system 14, a processing component 48 for searching and processing the received request against the data storage device 44 containing a variety of help related information, a retrieving component 50 to retrieve information from the data storage device, and an information fulfillment component 54 that downloads the requested information after retrieving from the data storage device to a plurality of users in the order in which the requests were received by the receiving component.

Web-based system 10 is accessed through a home page which provides the user with the ability to navigate and search information. The system allows a user to navigate, search, and in some cases create/edit/delete online documentation, manuals (also available in downloadable format), frequently asked questions, articles & URL's, various pages and other discussion materials. When a first time user enters the site, the user is presented with a generic page (not shown). After the user "sign up" for the system, a "cookie" is set up on the user's computer, which allows the system to customize the page on next return. Each home page also consists of several pre-set frames (not shown).

Figure 4:
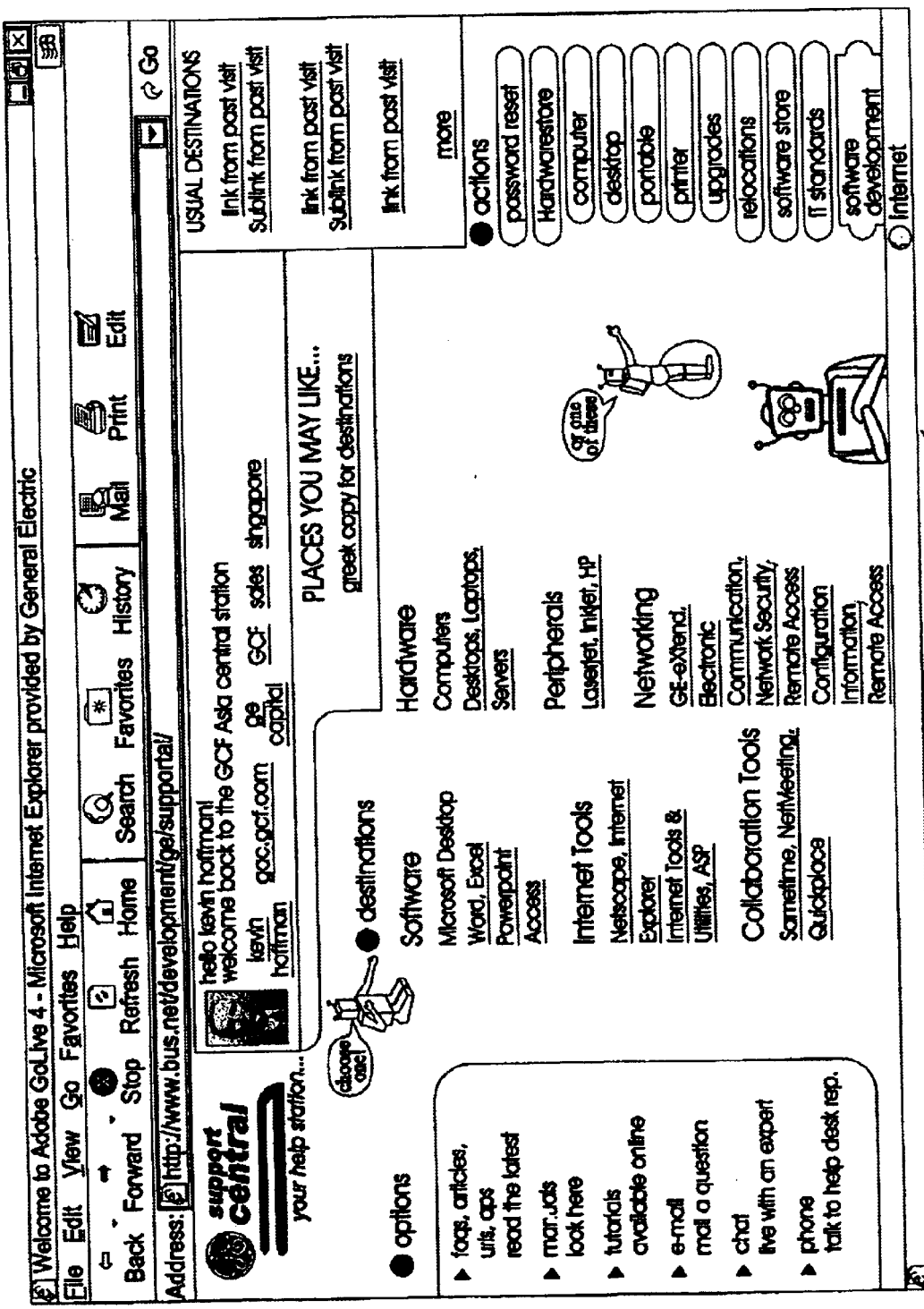
FIG. 4 is a web page downloaded on a client system by the server system after the user has logged on to the site.

FIG. 4 is a first user interface 70 downloaded on client system 14 by server system 12 after the user has logged on to the site. First user interface 70 provides various alternative hypertext links to the user.

Figure 5:
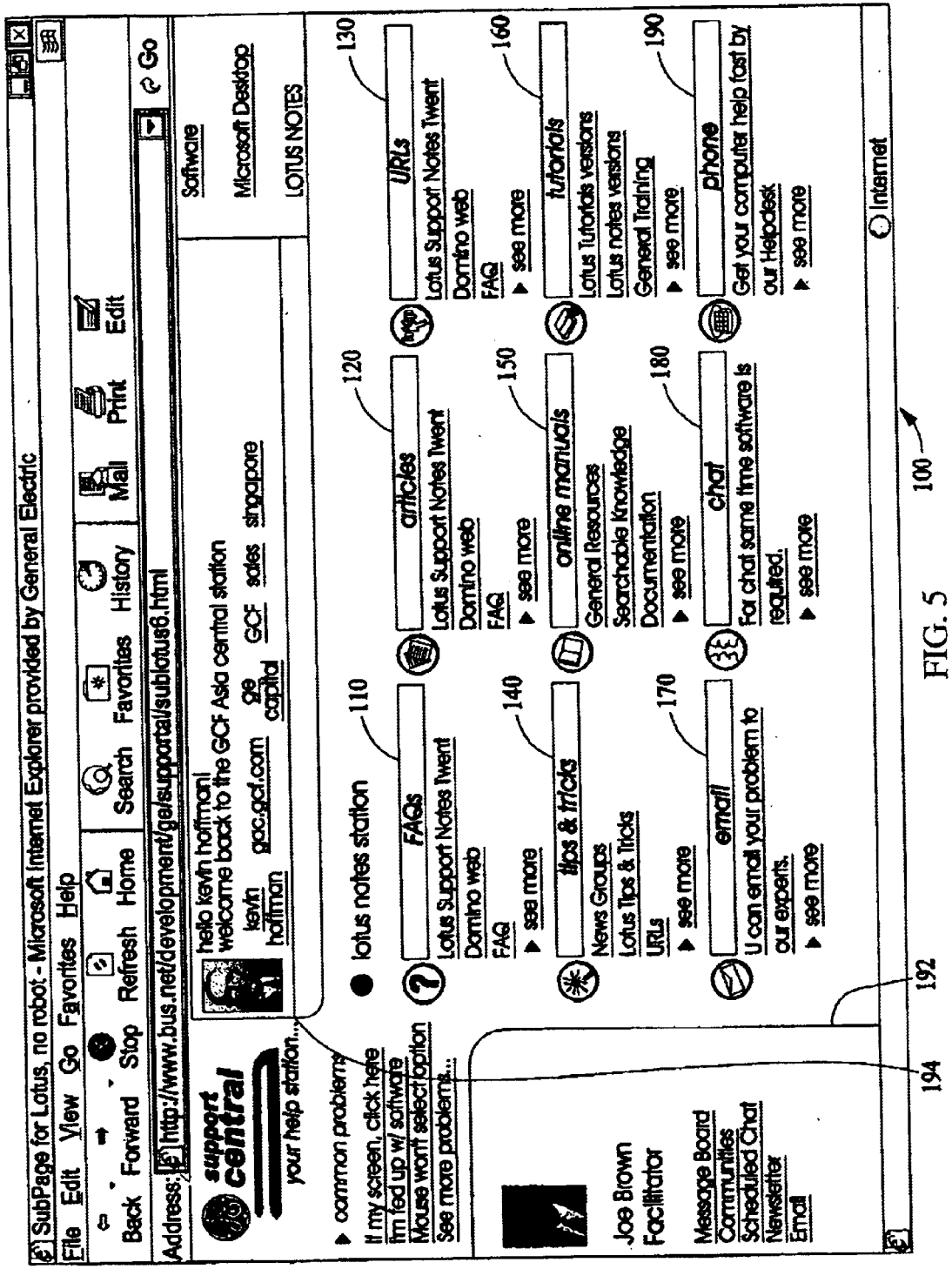
FIG. 5 is an exemplary embodiment of a user interface displaying various hypertext link alternatives to the user.

FIG. 5 is an exemplary embodiment of second user interface 100 that displays the various hypertext link alternatives to the user. These alternatives include: a frequently asked questions (FAQ) hypertext link 110, various related articles hypertext link 120, an URL hypertext link 130, tips and tricks hypertext link 140, an online manuals hypertext link 150, tutorials hypertext link 160, an e-mail hypertext link 170, a chat hypertext link 180, a phone hypertext link 190, a photograph 192 of an internal user, and a photograph 194 of a facilitator which includes hypertext links. The above described user interface and other user interfaces including various hypertext links described herein can be re-arranged in many different ways and can be used in various environments other than the Internet.

Frequently asked questions 110 include a list of frequently asked questions with their corresponding answers. Various related articles 120, tips and tricks 140 and Online Manuals 150 hypertext links allow the system to link online documentation and online manuals. The system is further capable of a more formalized process of document management and publication.

E-mail 170, chat 180 and phone 190 are designated as contact areas where users, experts and system owners communicate with each other on subjects relating to the overall system, its effectiveness or any other pertinent issues. Server system 12 is capable of managing multiple inquiries from a variety of users through e-mail 170, chat 180 or phone system 190. E-mail 170 has a number of features. One of the features allows users to formulate questions on a form and to post the question to a panel of experts. The user may assign questions to any number of experts within a panel of experts. System 10 also permits listing of average response time to answer a question. The user can select any particular expert based on the waiting time.

Chat feature 180 allows users to instantly communicate with a panel of experts within an organization. The user is offered three methods. The first method is instant message with one customer expert. The second method is on-line meeting with a panel of customer experts. The third method is a Community Chat Room. The user selects one of these methods based on a number of factors including the expert's availability.

Phone feature 190 represents the synchronous method of communication between customers and experts. This feature facilitates the customer to view a list of experts and their contact information. It also provides a mechanism that the customer can record a call log.

System 10 (described in FIG. 1) offers flexibility to identify an expert based on a keyword match. System 10 selects an expert based on a keyword match after comparing and analyzing a user's request against the expertise and biographical data of the available experts.

Figure 6:
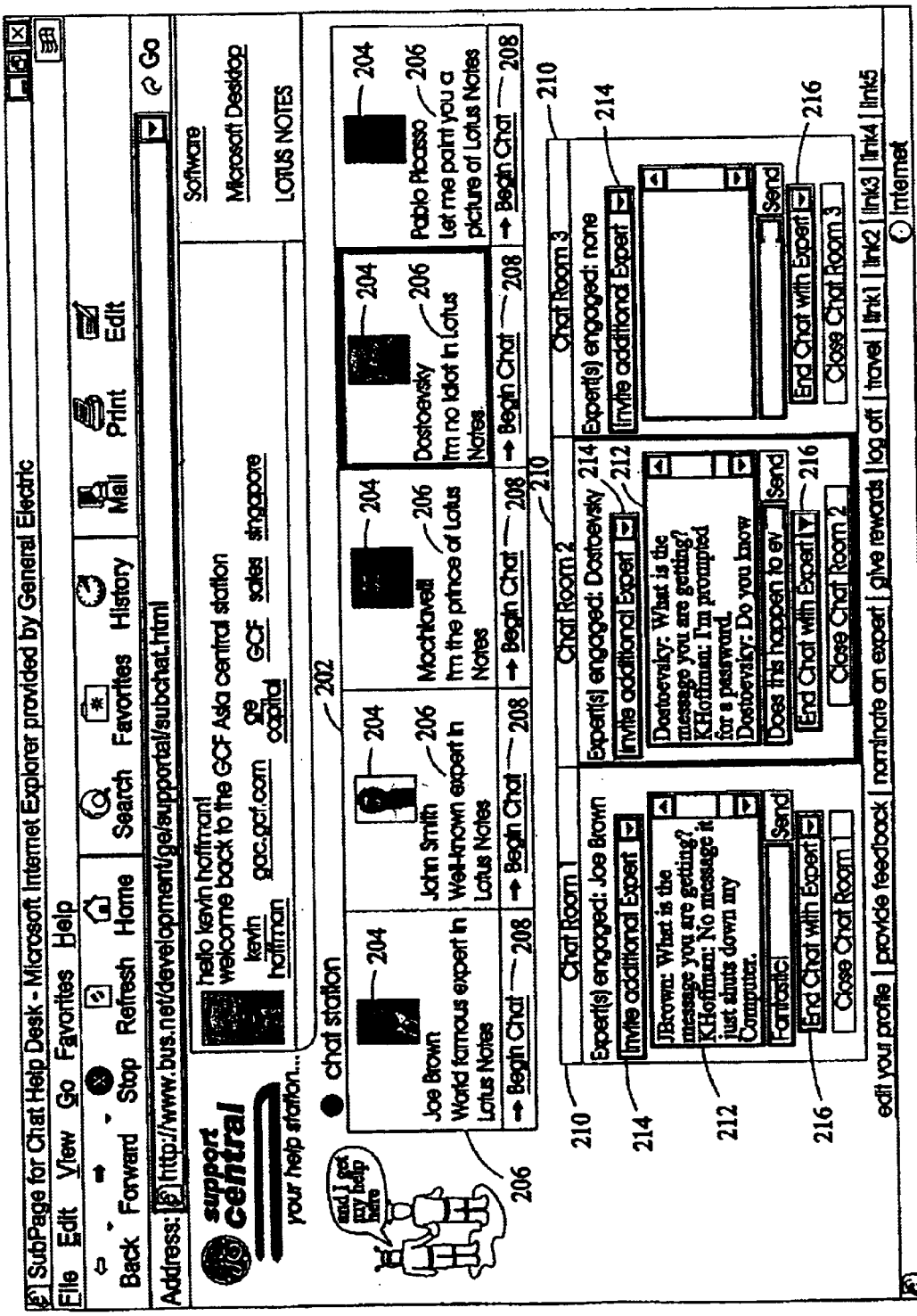
FIG. 6 is an exemplary embodiment of a chat room user interface.

FIG. 6 is an exemplary chat room user interface 200. Selection of chat feature 180 (shown in FIG. 5) causes a pool of experts 202 to be selected for an online meeting. Included in expert pool 202 are photographs 204 of the experts, areas of expertise and biographical data 206, such as length of service and testimonials, on each expert, and a link 208 to be used to engage the expert. A chat room window 210 shows which, if any, expert is engaged with the user and includes a textual dialog box 212 which shows the textual interchange between the expert and the user. Multiple chat room windows 210 can be used to engage a different expert and additionally, other experts can be invited into an active chat within one window by selecting an invite additional expert link 214 located within window 210. A user may also choose to end a chat with a particular expert by selecting that expert in a end chat menu 216.

Figure 7:
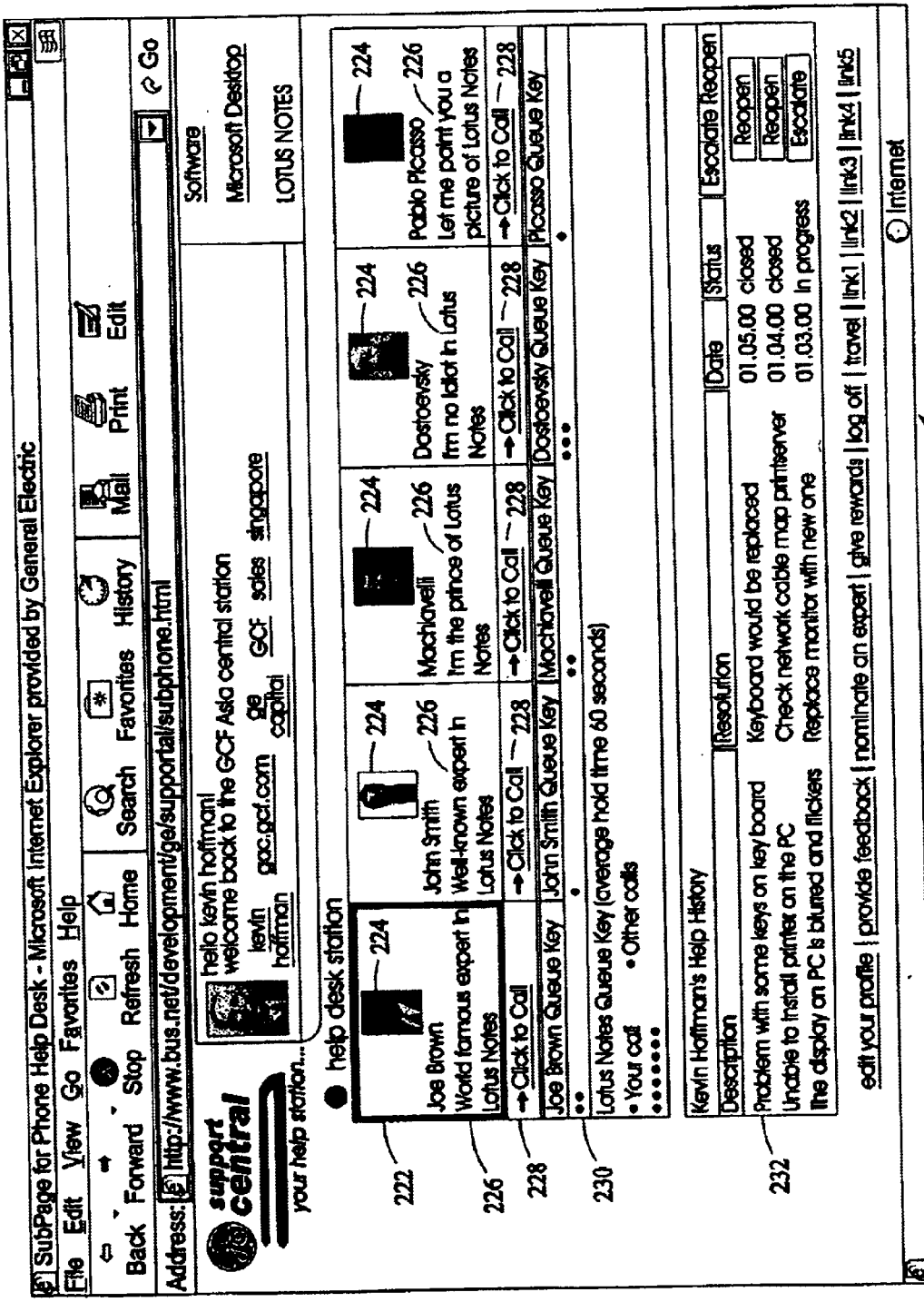
FIG. 7 is an exemplary embodiment of a telephone request user interface.

FIG. 7 is an exemplary phone request user interface 220. Selection of phone feature 190 (shown in FIG. 5) causes a pool of experts 222 to be selected for a telephone contact. Included in the expert pool 222 are photographs 224 of the experts, areas of expertise and biographical data 226, such as length of service and testimonials, on each expert, and a link 228 to be used to call that expert. Also included in expert pool 222 is a queue indicator 230 which shows how many calls are in the queue of each expert and also shows where the user's call is in relation to other calls in the queue. User interface 220 includes a history 232 which shows previous user interactions with the available experts.

Figure 8:
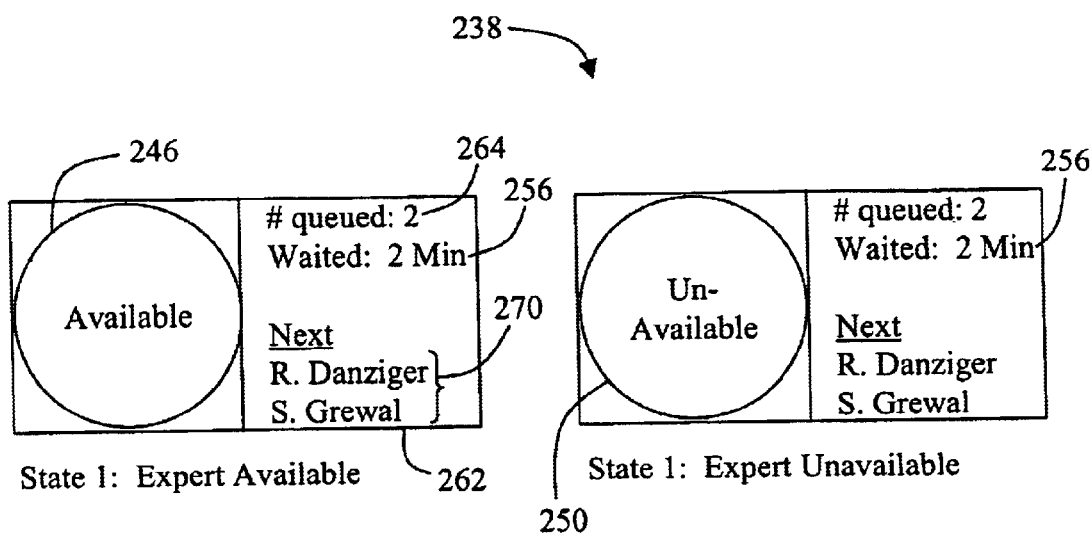
FIG. 8 is an exemplary embodiment of a graphical applet depicting expert availability as well as unavailability.
Figure 8:
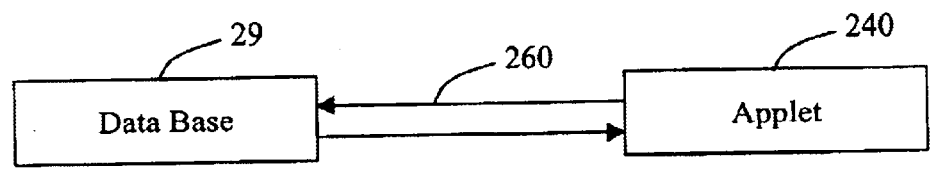

FIG. 8 is an exemplary embodiment 238 of an applet 240, linked to database 29, to indicate expert's current availability. Applet 240 indicates on user's device 14 expert's availability 246 or unavailability 250.

Applet 240 is implemented with a Java Applet or a native program in C or any other appropriate programming language running in an Intel PC window under the Windows operating or any other computer operating system. A Java applet is executed by a web browser when the browser loads an HTML document that contains an applet tag. The applet tag defines the width and height of the applet window within the HTML document. The applet tag has numerous attributes to enhance its placement within the HTML document. In an alternative embodiment, this functioning does not necessarily need an applet and can be done in a variety of programming methods.

Database 29 tracks an expert's availability, as well as users who have indicated that they would prefer to chat with the expert. The amount of time each user has waited 256 for a specific expert is also being tracked. Database 29 will consider the expert "unavailable" 250 if the applet 240 is not loaded or the computer 14 is off. Additional functionality exists within database 29 as well as server system 12 to indicate expert's availability. Database 29 is implemented using Oracle, but can be implemented on any available database or even with a flat file residing on any device 14. Database 29 consists of the tables with the identification of the experts and their availability. Applet 240 communicates in both directions 260 with database 29.

The applet utilizes a simple interface, consisting of a large button that toggles the expert's availability as 'on' or 'off,' as viewed by customers. It has a small "footprint" (i.e.; 1 inch tall by 2 inches wide) 262 so that it is visible at all times without being obtrusive, with an option to leave it "always on top" on device 14. The 'on/off' button comprises the majority of the applet's real estate, with additional space to be allocated for statistical information, such as viewing the number of people 264 as well as names of people 270 queued to chat. Additional functionality is built into the applet, if required.

With this system, the expert has full knowledge of the current activities to help manage their availability to customers and view vital statistics, all without the need of a web browser. Non browser-based applet 240 interface is utilized to allow it to be "always on top" in order to prominently display availability 246 and queue information 264 without cluttering the experts' desktop device 14. The underlying database 29 updates the customer's window into an expert's availability in real time. In addition to displaying expert information on the client system based on the updated information from database 29, system 10 further displays previous customer interactions with the available experts within the expert pool. In an alternative embodiment, the information that is available in a non-browser environment is also provided to client system 14 having a browser.

Figure 9:
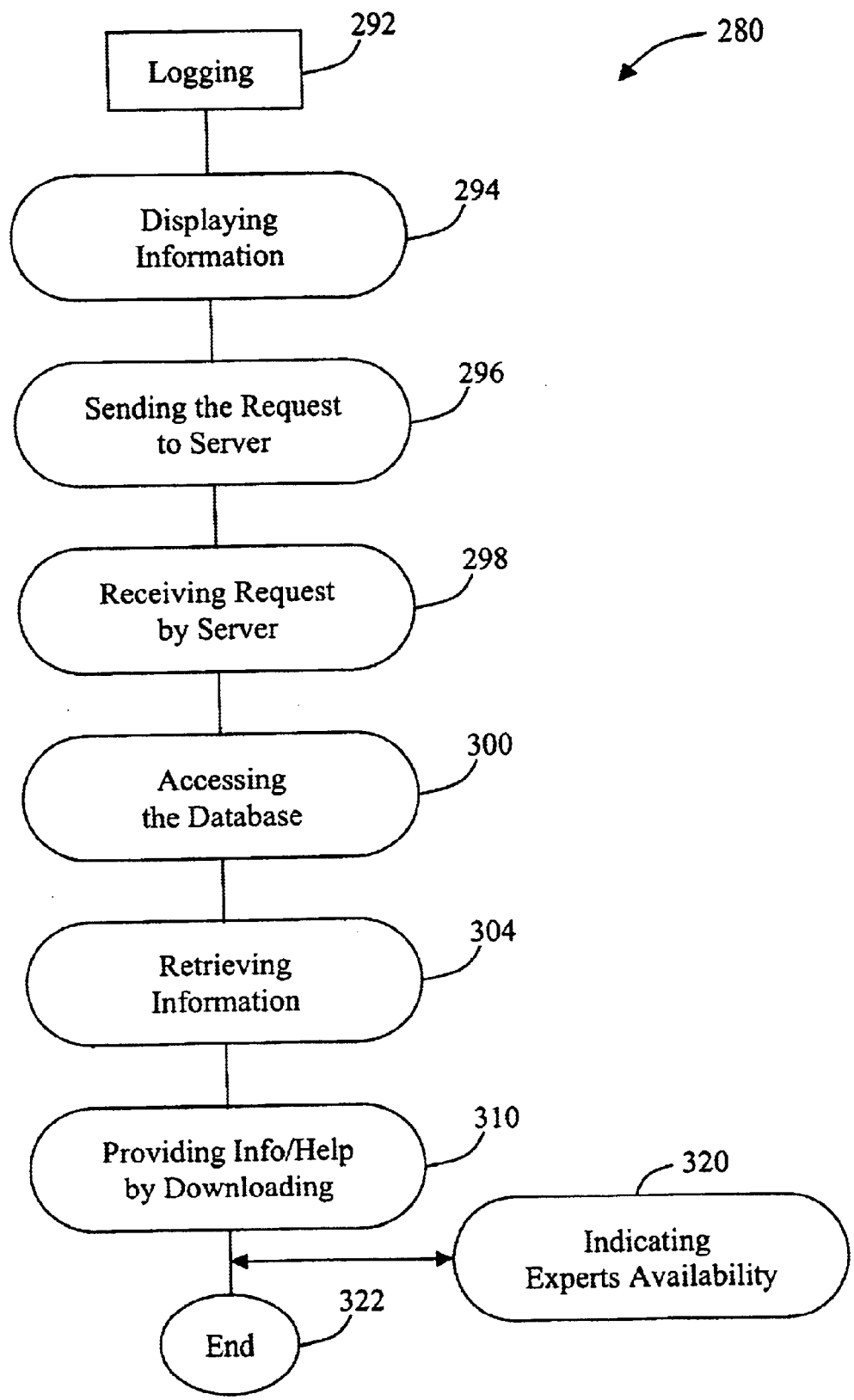
FIG. 9 describes an algorithm as used by the system to assist a user when the user logs on to a home page of the web site through the client system.

FIG. 9 describes an algorithm 280 as used by the system to help a user when the user logs on to a home page of the web site through client system 14. After logging 292, the user requests help through client system 14 by selecting one of a hypertext link displayed out of all displayed 294 hypertext links. Once the user makes a specific selection, the specific selection is sent to server system 12. The sending 296 is accomplished in response to click of a mouse or to a voice command. Once server system 12 receives 298 the request, server system 12 displays the information in response to this request on client system 14. Server system 12 accesses 300 the database and retrieves 304 related information from the database. The requested information is provided 310 to client system 14 by downloading the information from server 12. Method 280 also keeps customers informed by indicating 320 expert's availability to the customer.

While the invention has been described in terms of various specific embodiments, those skilled in the art will recognize that the invention can be practiced with modification within the spirit and scope of the claims.

What is claimed is:

1. A method for indicating expert availability to a help-seeker from a pool of experts currently in communication with a client system-server system, said method comprising the steps of:

connecting the client system to the server system;

providing a database within the server system comprising a pool of available experts with corresponding expert information including at least one area of expertise and biographical data of each expert, wherein an available expert is an expert currently in communication with the client system, the experts pool further comprising identification of experts and their availability for providing immediate help to the help-seeker;

displaying information on the client system identifying alternative paths for assistance to the help-seeker, the alternative paths include at least one of an educational path and an expert assistance path, the educational path includes information from a plurality of sources, the expert assistance path includes access to the pool of available experts stored in the database;

receiving from the help-seeker through the client system, after the help-seeker has selected the expert assistance path, a request for at least one available expert;

searching the database to match the help-seeker request with at least one of an area of expertise and biographical data of each expert within the pool of available experts;

retrieving at least one available expert with corresponding expert information satisfying the database search;

displaying on the client system to the help-seeker at least one available expert with corresponding expert information that satisfies the help-seeker's request, the expert information further includes expert availability information displayed through an applet downloaded from the server system and a help history, the expert availability information includes an expert availability indicator that displays a waiting time for each available expert displayed and an average amount of time the expert spends assisting a help-seeker, the help history displays a summary of prior communications between the help-seeker and available experts;

prompting the help-seeker to select at least one available expert from the display based on the expert information and the expert availability information; and contacting the selected expert through the client system via at least one of instant messaging, on-line meeting, and on-line chat.

2. A method according to claim 1 wherein said step of displaying expert information on the client system further comprises the step of displaying photographs of the available experts within the expert pool.

3. A method according to claim 1 wherein said step of displaying expert information on the client system further comprises the step of displaying testimonials for the available experts within the expert pool.

4. A method according to claim 1 wherein displaying a help-history summarizing prior communications between the help-seeker and available experts includes a description of each prior matter submitted by the help-seeker to an available expert, a resolution of each matter submitted, a date each matter was submitted, and a status of each matter submitted.

5. A method according to claim 1 wherein said step of displaying expert information on the client system further comprises the step of displaying length of service for the available experts within the expert pool.

6. A method according to claim 1 wherein said step of displaying expert information on the client system further comprises the step of displaying areas of expertise of the available experts within the expert pool.

7. A method according to claim 1 wherein said step of displaying expert information on the client system further comprises the step of displaying previous customer interactions with the available experts within the expert pool.

8. A method according to claim 1 wherein said step of displaying expert information on the client system further comprises the step of displaying which experts within the expert pool are free and which experts are helping other users.

9. A method according to claim 1 wherein said step of displaying expert information on the client system further comprises the step of displaying which experts within the expert pool are free and which experts are helping other users through an expert availability indicator displayed on the client system.

10. A method according to claim 9 wherein said step of displaying expert information through an expert availability indicator further comprises the step of displaying availability information through an applet implemented through a well known programming language including at least one of Java, C, and C++.

11. A method according to claim 9 wherein said step of displaying expert information through an expert availability indicator further comprises the step of tracking expert availability.

12. A method according to claim 11 wherein said step of tracking expert availability further comprises the steps of:
   tracking experts availability;
   tracking users who are interested in contacting a specific expert;
   tracking an amount of time each user has been waiting to connect with the specific expert; and
   displaying the expert availability on the client system.

13. A method according to claim 1 wherein said step of contacting the selected expert further comprises the step of using user input into a user interface to select a free expert or join a queue of an expert currently helping another user.

14. A method according to claim 13 wherein said step of contacting the selected expert further comprises the step of using user input to select a free expert or join a queue of an expert currently helping another user after having previously selected the queue of a different expert.

15. A method according to claim 1 wherein said step of contacting the selected expert further comprises the step of selecting an expert based on a keyword match.

16. A method according to claim 15 wherein said step of selecting an expert based on a keyword match further comprises the step of analyzing a user's request against the expertise and biographical data of available experts.

17. A system for indicating expert availability to a help-seeker, through an applet, from a pool of experts, said system comprising:
   a server system;
   a client system configured with a browser, said client system connected to said server system; and
   a database comprising a pool of available experts with corresponding expert information including at least one area of expertise and biographical data of each expert, wherein an available expert is an expert currently in communication with the client system, the expert pool further comprising identification of experts and their availability for providing immediate help to the help-seeker, said server system configured to display on the client system information identifying alternative paths for assistance to the help-seeker, the alternative paths including at least one of an educational path and an expert assistance path, the educational path includes information from a plurality of sources, the expert assistance path includes access to the pool of available experts stored in the database receive from the help-seeker through the client system, after the help-seeker has selected the expert assistance path, a request for at least one available expert;
   search the database to match the help-seeker request with at least one of an area of expertise and biographical data of each expert within the pool of available experts;
   retrieve at least one available expert with corresponding expert information satisfying the database search;
   display on the client system to the help-seeker at least one available expert with corresponding expert information that satisfies the help-seeker's request, said expert information further comprises expert availability information displayed through an applet and a help history, said expert availability information comprises an expert availability indicator that displays a waiting time for each available expert displayed and an average amount of time said expert spends assisting a help-seeker, said help history displays a summary of prior communications between the help-seeker and available experts; and
   prompt the help-seeker to select at least one available expert from the display based on said expert information and said expert availability information.

18. A system according to claim 17 wherein said expert pool database further configured with photographs of the available experts.

19. A system according to claim 17 wherein said expert pool database further configured with testimonials for the available experts.

20. A system according to claim 17 wherein said expert pool database further configured with biographical data of the available experts.

21. A system according to claim 17 wherein said expert pool database further configured with length of service for the available experts.

22. A system according to claim 17 wherein said expert pool database further configured with areas of expertise for the available experts.

23. A system according to claim 17 wherein said expert pool database further configured with specific customer previous interactions with the available experts.

24. A system according to claim 17 wherein said expert pool database further configured to cause said server system to show a user which experts are free and which experts are helping other users on said client system.

25. A system according to claim 24 wherein said expert pool database further configured to allow said client system to cause said server system to select a free expert or to join a queue of an expert currently helping another user.

26. A system according to claim 25 wherein said expert pool further configured to allow said client system to cause said server system to select a free expert or join a queue of an expert currently helping another user after having previously selected the queue of a different expert.

27. A system according to claim 25 wherein said expert pool database further configured to allow a user to engage an expert by exchanging textual messages.

28. A system according to claim 25 wherein said expert pool further configured to allow a user to engage an expert by telephone.

29. A system according to claim 17 wherein said server system configured as a server system for a network of client devices.

30. A system according to claim 29 wherein said server system and said client system are connected via a network, and said network is at least one of a wide area network, a local area network, an intranet, and the Internet.

31. A system according to claim 17 wherein displaying a help-history comprises a description of each prior matter submitted by the help-seeker to an available expert, a resolution of each matter submitted, a date each matter was submitted, and a status of each matter submitted.

32. A system according to claim 17 wherein said server system is further configured to select an expert based on a keyword match after analyzing a user's request against the expertise and biographical data and other information including correspondence record of chat sensors of the available experts.

33. A system according to claim 17 wherein said server system is further configured to display which experts within the expert pool are free and which experts are helping other users.

34. A system according to claim 17 wherein said server system is further configured to display which experts within the expert pool are free and which experts are helping other users through an expert availability indicator displayed on the client system.

35. A system according to claim 34 wherein said server system is further configured to display availability information through an applet implemented in at least one of a well known programming languages such as Java, C, and C++.

36. A system according to claim 17 wherein said server system is further configured to track expert availability.

37. A system according to claim 36 wherein said server system configured to display expert availability is further configured to:

track expert availability;

track users who are interested in contacting a specific expert;

track an amount of time each user has been waiting to connect with the specific expert; and display the expert availability on the client system.

38. A system according to claim 17 wherein said server system further configured to contact an expert based on user input into the client system.

39. A system according to claim 38 wherein said server system further configured to use user input from a user interface to select a free expert or join a queue of an expert currently helping another user.

40. A system according to claim 17 wherein said server system further configured to contact an expert based on user input from the client system to select a free expert or join a queue of an expert currently helping another user after having previously selected the queue of a different expert.

* * * * *